United States Patent
Liu et al.

(10) Patent No.: US 11,151,245 B2
(45) Date of Patent: Oct. 19, 2021

(54) USER AUTHENTICATION

(71) Applicant: Hewlett-Packard Development Company, L.P., Spring, TX (US)

(72) Inventors: Lei Liu, Palo Alto, CA (US); Ning Ge, Palo Alto, CA (US); Steven J. Simske, Fort Collins, CO (US); Helen A. Holder, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 339 days.

(21) Appl. No.: 16/329,467

(22) PCT Filed: Sep. 9, 2016

(86) PCT No.: PCT/US2016/051063
§ 371 (c)(1),
(2) Date: Feb. 28, 2019

(87) PCT Pub. No.: WO2018/048427
PCT Pub. Date: Mar. 15, 2018

(65) Prior Publication Data
US 2019/0220592 A1    Jul. 18, 2019

(51) Int. Cl.
*G06F 21/55* (2013.01)
*G06F 21/50* (2013.01)
(Continued)

(52) U.S. Cl.
CPC ............ *G06F 21/552* (2013.01); *G06F 21/31* (2013.01); *G06F 21/32* (2013.01); *G06F 21/50* (2013.01);
(Continued)

(58) Field of Classification Search
CPC . H04L 29/06836; G06F 21/552; G06F 21/31; G06F 21/32; G06F 21/50; G06F 21/55
See application file for complete search history.

(56) References Cited

U.S. PATENT DOCUMENTS 8,448,230 B2   5/2013  Baughman et al.
9,262,613 B1   2/2016  Harding
(Continued)

FOREIGN PATENT DOCUMENTS

WO    WO-0122351 A1    3/2001

OTHER PUBLICATIONS

Ponce, A.; A Dynamic Behavioral Biometric Approach to Authenticate Users Employing Their Fingers to Interact with Touchscreen Devices' 2015; http://nsuworks.nova.edu/cgi/viewcontent.cgi?article=1046&context=gscis_etd.
(Continued)

*Primary Examiner* — Hee K Song
(74) *Attorney, Agent, or Firm* — HP Inc. Patent Department (57) ABSTRACT

Examples associated with user authentication are described. One example method includes authenticating a user of a device using a static authentication technique. A behavior profile associated with the user is loaded. The behavior profile describes a pattern of device usage behavior by the user in a three-dimensional space over a time slice. The behavior profile also identifies distinctive user habits. Usage of the device is monitored, and a behavior similarity index is periodically updated. The behavior similarity index describes a similarity between the usage of the device and the pattern of device usage behavior. The behavior similarity index is weighted based on the distinctive user habits. Access to the device is restricted when the behavior similarity index reaches a predefined threshold.

14 Claims, 7 Drawing Sheets

(51) Int. Cl.
  *G06F 21/31* (2013.01)
  *G06F 21/32* (2013.01)
  *H04L 29/06* (2006.01)

(52) U.S. Cl.
  CPC ........ *G06F 21/55* (2013.01); *H04L 29/06836* (2013.01)

(56) References Cited

U.S. PATENT DOCUMENTS

| | | |
|---|---|---|
| 2007/0236330 A1 | 10/2007 | Cho et al. |
| 2008/0092245 A1 | 4/2008 | Alward et al. |
| 2008/0101658 A1 | 5/2008 | Ahern et al. |
| 2010/0115610 A1 | 5/2010 | Tredoux et al. |
| 2013/0102283 A1 | 4/2013 | Lau et al. |
| 2015/0213244 A1* | 7/2015 | Lymberopoulos ...... G06F 21/32 726/18 |
| 2015/0302263 A1 | 10/2015 | Shubinsky et al. |
| 2016/0164866 A1 | 6/2016 | Oberheide et al. |
| 2017/0236330 A1* | 8/2017 | Seif ...................... G06F 3/0202 345/633 |

OTHER PUBLICATIONS

Vasiete, E. et al;Toward a Non-intrusive, Physio-behavioral Biometric for Smartphones: Sep. 23-26, 2013; http://www.umiacs.umd.edu/~pvishalm/Conference_pub/MobileHCI2014.pdf.

* cited by examiner

Figure 7

USER AUTHENTICATION

BACKGROUND

Device security is a growing concern today. While some device security issues involve preventing malicious code from running on devices, other device security issues involve ensuring that only authorized users are allowed to access the device to prevent unauthorized access to devices, resources, data, and so forth. Today, systems rely on static authentication techniques to ensure that users of the device have permission to operate the device. These static authentication techniques may involve a password, a biometric, an authenticating device, and so forth.

BRIEF DESCRIPTION OF THE DRAWINGS

The present application may be more fully appreciated in connection with the following detailed description taken in conjunction with the accompanying drawings.

DETAILED DESCRIPTION

Systems, methods, and their equivalents associated with user authentication are described. A user may initially authenticate themselves to a device (e.g., personal computer, laptop, mobile device) using a static authentication technique. The static authentication technique may include, for example, a password, a biometric, and so forth. Subsequently, the device may begin monitoring the behaviors of the user of the device and compare these behaviors to stored behavior information associated with the user who authenticated themselves using the static authentication technique. The monitored behaviors may be, for example, motions, habits, and other indicators associated with the authenticated user, as the authenticated has performed certain activities in the past.

For example, how the current user performs specific computer interactions, including double-clicks, specific patterns of typing, moves a mouse, swipes, and so forth when performing various activities using the device may be compared to recorded habits and behaviors of the authenticated user. If the behaviors of the device user and the authenticated user diverge past a defined threshold, the device may lock out the current user of the device to prevent the current user from gaining improper access to data, applications, systems, and so forth. This ongoing authentication may continually check to determine whether a user other than the authenticated user is currently accessing the device, and may be more secure than a one-time authentication at the beginning of a usage session of the device.

Figure 1:
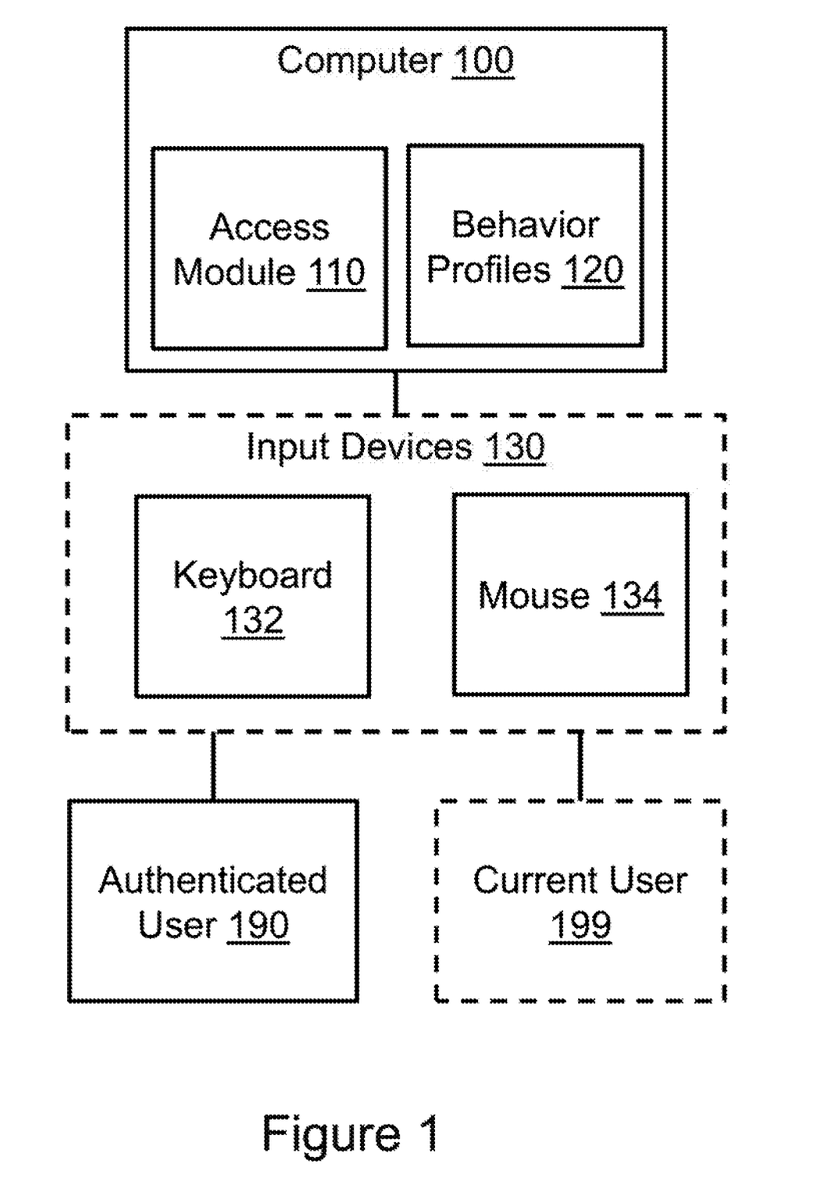
FIG. 1 illustrates an example computer associated with user authentication.

FIG. 1 illustrates an example computer 100 associated with user authentication. It should be appreciated that the items depicted in FIG. 1 are illustrative examples, and many different systems, devices, and so forth, may operate in accordance with various examples.

FIG. 1 illustrates an example computer 100 associated with user authentication. While an example associated with a computer is described, techniques described herein may also function with respect to other types of devices (e.g., mobile devices). Depending on whether computer 100 is a personal computer, a work computer, and so forth, various parties may be interested ensuring that the contents, applications, and so forth associated with computer 100 are only accessed by authorized parties.

Consequently, computer 100 may include an access module 110. Access module 110 may control various aspects of authenticating users seeking to operate computer 100 both before and during the accesses by users to computer 100. For example, before providing an initial access to computer 100, access module 110 may obtain a static authentication from a user. As used herein, a static authentication generally refers to a one-time authentication technique that is used to grant access to a system or device, often by providing a piece of information to the device. This is distinct from an authentication technique that is continuously applied during usage of the device. For example, when a user enters a password or pin number to unlock a device, the user may be granted access to the device until the user manually locks the device or a timeout occurs (e.g., from lack of use). Forms of static authentication may include, for example, exact authentications including passwords, pin numbers, provision of a number from a security device, and so forth. Other static authentication techniques, such as those derived from statistical analysis of an input, may include gesture patterns, biometric authentications, and so forth.

Once a user has been successfully authenticated to access module 110, access module 110 may consider them an authenticated user 190. However, authenticated user 190 may not continue to use computer 100. Authenticated user 190 may walk away from computer 100, or even allow another user to use computer 100. Consequently, a current user 199 may differ from the authenticated user 190. Further, if a static authentication technique becomes compromised, such as by obtaining authenticated user 190's password, current user 199 may be a malicious user who authenticated user 190 does not want to access computer 100.

To prevent undesirable access to computer 100, access module 110 may load a behavior profile associated with authenticated user 190 when authenticated user 190's credentials are provided to access module 110. The behavior profile may include data describing patterns of device usage behavior by authenticated user 190. These behaviors may include, for example, the duration of keyboard presses by authenticated user 190, times between double clicks by authenticated user 190, user stress, and so forth. In some examples, behavior profiles 120 may also indicate distinctive user habits. Distinctive user habits may be behaviors specific to authenticated user 190 that deviate from a group of users by more than a known threshold. Consequently, a current user 199 that exhibits a behavior that is classified as a distinctive user habit to authenticated user 190 may be more likely to be authenticated user 190 than a current user 199 who does not exhibit the distinctive user habit. Distinctive user habits may also include, for example, specific steps a user employs to achieve a task such as accessing a specific file, copying and pasting text, saving a document. Consequently, a current user 199 deviating from these specific actions may not be authenticated user 190. When there are doubts about whether current user 199 is authenticated user 190, current user 199 may be prompted to input a password or pin to give access module 110 assurances that current user 199 is authenticated user 190.

To detect the behaviors of current user 199 and/or authenticated user 190, computer 100 may employ various input devices 130 connected to computer 100. In this example, computer 100 has access to a keyboard 132 and a mouse 134. Depending on what input devices 130 are available to computer 100, access module 110 may be able to compare different behaviors between authenticated user 190 and current user 199. By way of illustration, if computer 100 sometimes has access to a drawing tablet, but presently cannot detect one connected to computer 100, computer 100 may rely solely on input devices 130 presently connected to computer 100 to evaluate whether authenticated user 190 and current user 199 are the same user. If a drawing tablet is subsequently connected, and current user 199 begins using it, computer 100 may then be able to evaluate the behaviors of current user 199 based on the inputs of current user 199 to the drawing tablet.

Once information describing behaviors of current user 199 has been gathered using input devices 130, access module 110 may perform a series of actions to determine whether current user 199 is authenticated user 190. First, filtering may be performed on the gathered data to, for example, remove sensor artifacts, filter non-related biometric data (e.g., background noise). Filtering may be achieved using, for example, adaptive filtering techniques, filter banks, and so forth, to detect slow waves, fast waves, spikes, and so forth from recorded signals that indicate actions and/or responses by current user 199.

Access module 110 may then select representative features for comparison between current user 199 and a behavior profile 120 associated with authenticated user 190. These features may be a subset of features described in behavior profiles, a linear or nonlinear combination of multiple features, and so forth. Features may also be selected based on input devices 130 available to computer 100. Feature selection may be based on, for example, principle component analysis, singular value decomposition, latent semantic analysis, and so forth.

After selecting features, a distance metric may be derived to evaluate similarities and differences between the behaviors of current user 199 and those of authenticated user 190 described in their behavior profile 120. The distance metric may be, for example, linear, nonlinear, depend on the data distribution of the behavior profile 120 of authenticated user 190, and so forth. Distance metrics may vary on an individual basis based on the data described in behavior profiles 120 including distinctive user habits of authenticated user 190, input devices available to computer 100, and so forth. Additionally, as behavior patterns may vary from person to person, distance metrics may vary between authenticated users as well. Consequently, a user who rigidly performs tasks within a small standard deviation may have a smaller allowable distance metric than a user who performs tasks differently over time.

Once a distance metric has been derived, a distance between the gathered behaviors of current user 199 and previously recorded behaviors of authenticated user 190 may be determined. When the distance achieves a certain threshold, access module 110 may believe that current user 199 is not authenticated user 190. Consequently, access module 110 may restrict access to computer 100. Depending on the value of data on computer 100, computer 100 may restore access after a successful static authentication, after being brought to a known secure location, and so forth.

How access module 110 restricts access to computer 100 may depend on the sensitivity of the data, applications, and so forth accessible via computer. If computer 100 is a home computer where multiple users may operate computer 100, and where an adult may unlock computer 100 for a child, access module 110 may continue to allow access to certain functionalities of computer 100. For example, the adult may specify that the child has access to applications and files that will allow the child to complete homework and play games, but not modify system settings or access the internet. In scenarios where computer 100 is used by an employee of a company for work purposes, the company may desire to have computer 100 entirely lock itself down until, for example, computer 100 has returned to a known secure location and authentication credentials have been provided. Other configurations for access module 110 may also be appropriate.

In some examples, behavior profiles may be generated prior to preforming behavior based ongoing authentication. In some examples, behavior profiles may be generated as a part of the process of setting up a user account. In these examples, a user may be asked to complete a specific set of tasks so that a baseline behavior profile may be generated for the user. These tasks may include, typing one or more paragraphs, speaking into a microphone, accessing and/or modifying certain system resources, and so forth. In other examples, how the authenticated user operates the system on their first few accesses may be used to develop the initial behavior profile.

In other examples, behavior profiles may be generated and/or updated on the fly. Updating the behavior profiles may ensure that a user whose habits evolve over time does not eventually begin getting locked out of their device at a later time. By way of illustration, a novice computer user who initially copies and pastes text using application specific icons, may eventually learn to copy and paste using right mouse button menus, and later keyboard shortcuts. Other user attributes may also change over time as the user becomes more familiar with the operation of the computer, becomes a more sophisticated user, changes peripherals accessible to the device, and so forth.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
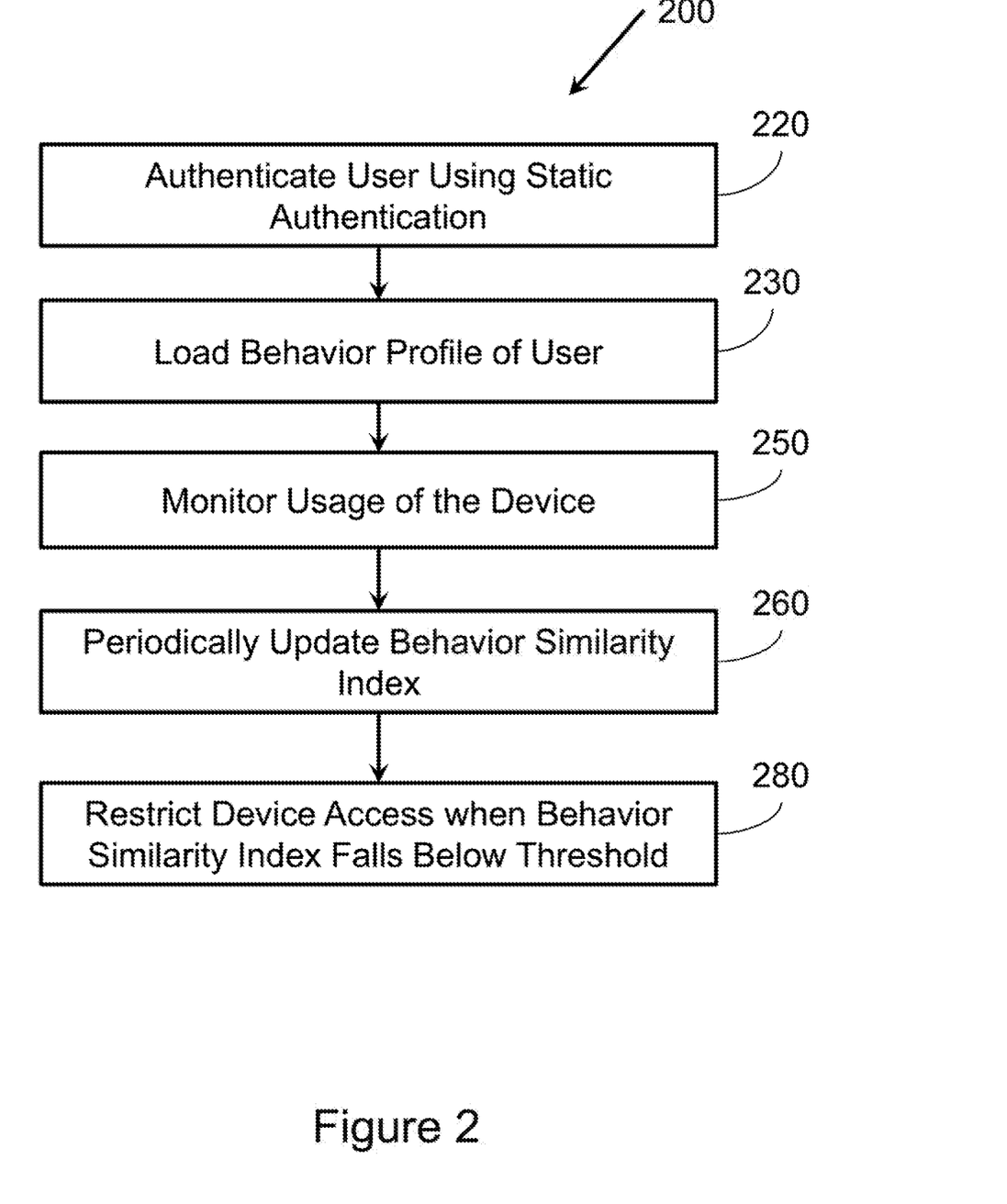
FIG. 2 illustrates a flowchart of example operations associated with user authentication.

FIG. 2 illustrates an example method 200 associated with user authentication. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 includes authenticating a user at 220. The user may be authenticated using a static authentication technique. As used herein, a static authentication technique may refer to a one-time authentication technique, as opposed to an ongoing authentication technique. Consequently, static authentication techniques may be based on an input of a password, an image based biometric such as facial recognition or an iris scan, voice recognition, a personal identification number, a signal received from an authenticating device entrusted to a user, and so forth.

Method 200 also includes loading a behavior profile of the user at 230. The behavior profile may describe patterns of device usage behavior by the user in a three-dimensional space over time slices. Thus, the device usage behavior may describe how the user interacts with the device, peripherals connected to the device and so forth. For example, three-dimensional features may be gathered based on movement of a mouse by the user, motion gathered from an input device worn on the user's hand as the user operates the device, and so forth. In some examples, the behavior profile may identify distinctive user habits. Distinctive user habits may be behaviors that, for example, deviate from a known group of users by a known threshold, describe a common way the user completes a specific task, and so forth. Patterns of device usage may include information describing, for example, hand motion data, mouse motion data, keystroke metrics, stress data, and so forth. Hand motion data may be obtained by tracking motion of a sensory device.

Method 200 also includes monitoring usage of the device at 250. As discussed above, usage of the device may be monitored using the peripherals and/or input devices connected to the device. Input devices may include mice, keyboards, microphones, hand motion trackers, cameras, touchscreens, and so forth.

Method 200 also includes periodically updating a behavior similarity index at 260. The behavior similarity index may describe a similarity between the usage of the device and the patterns of device usage behavior. Additionally, the behavior similarity index may be weighted based on the distinctive user habits.

Method 200 also includes restricting device access at 280. Device access may be restricted when the behavior similarity index reaches a predefined threshold. By way of illustration, the threshold may be a point at which it is likely that a current user of the device and the user that was authenticated at action 220 are not the same user. Consequently, access to the device may be restricted to prevent the current user of the device from inappropriately accessing device functions, sensitive data, and so forth. Using behavior metrics may make the device more secure by facilitating ongoing authentication as long as the device is in use. Ongoing authentication may prevent an unauthorized user from accessing device resources, applications, data, and so forth.

Figure 3:
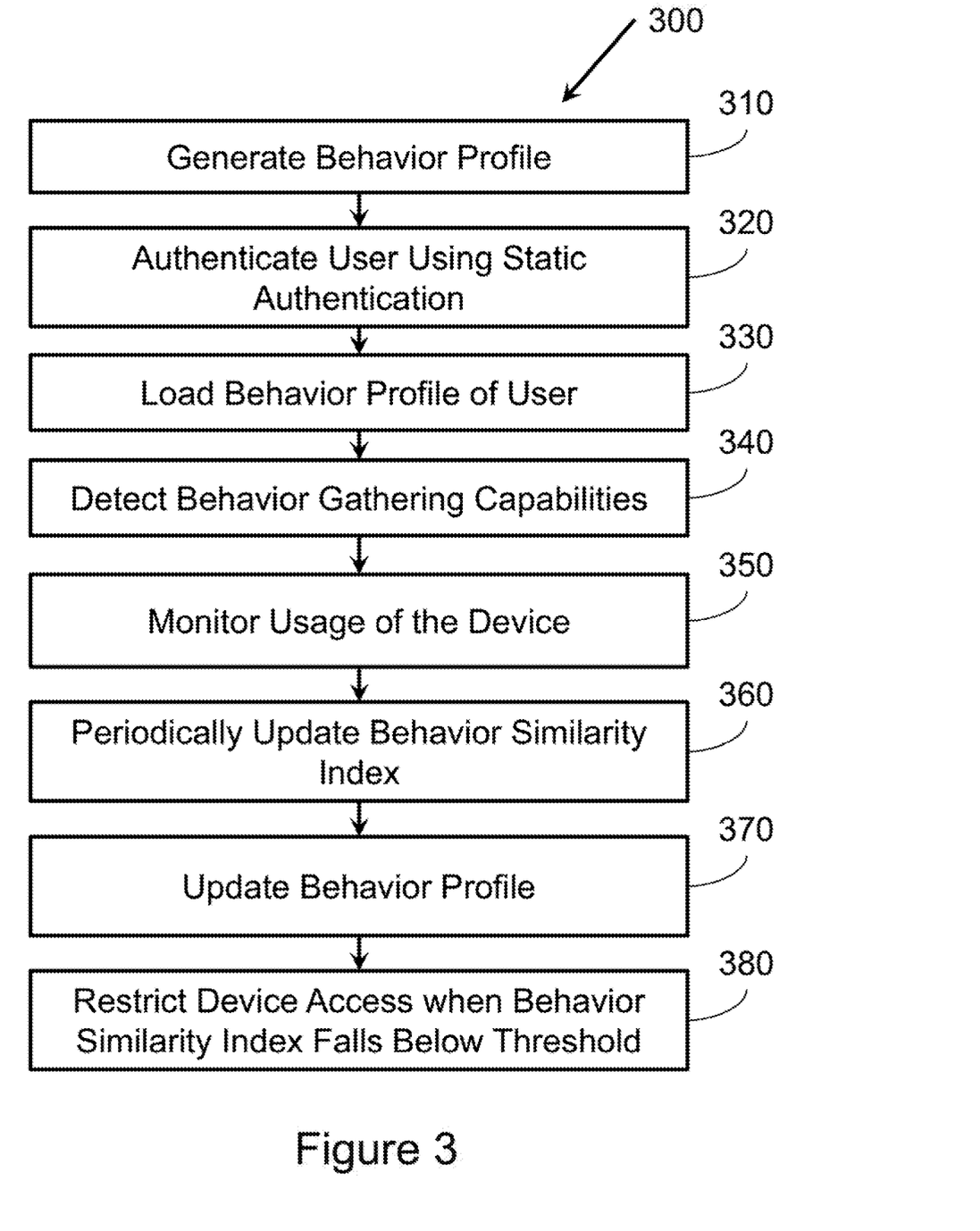
FIG. 3 illustrates another a flowchart of example operations associated with user authentication.

FIG. 3 illustrates a method 300 associated with user authentication. Method 300 includes several actions similar to those described above with reference to method 200 (FIG. 2). For example, method 300 includes authenticating a user at 320, loading a behavior profile of the user at 330, monitoring usage of the device at 350, periodically updating a behavior similarity index at 360, and restricting device access at 380.

Method 300 also includes generating the behavior profile at 310. In some examples, the behavior profile may be generated during a setup period for the device or setting up an account for an authorized user. In these examples, the authorized user may be asked to perform a set of tasks during which a baseline behavior profile may be generated. In other examples, the behavior profile may be generated during the first few times the authenticated user operates the device.

Method 300 also includes detecting behavior gathering capabilities of the device at 340. The usage of the device may be monitored at action 350 based on the behavior gathering capabilities of the device. Additionally, the similarity index may discounts attributes of the patterns of device usage behavior that the device is unable to gather.

Method 300 also includes updating the behavior profile at 370. The behavior profile may be updated based on the usage of the device monitored at action 350. So long as access has not been recently restricted, device usage information may be gathered and stored in the behavior profile to indicate manners in which the behaviors of the authenticated user have changed over time, whether due to learning new techniques, changing peripherals, aging, and so forth.

Figure 4:
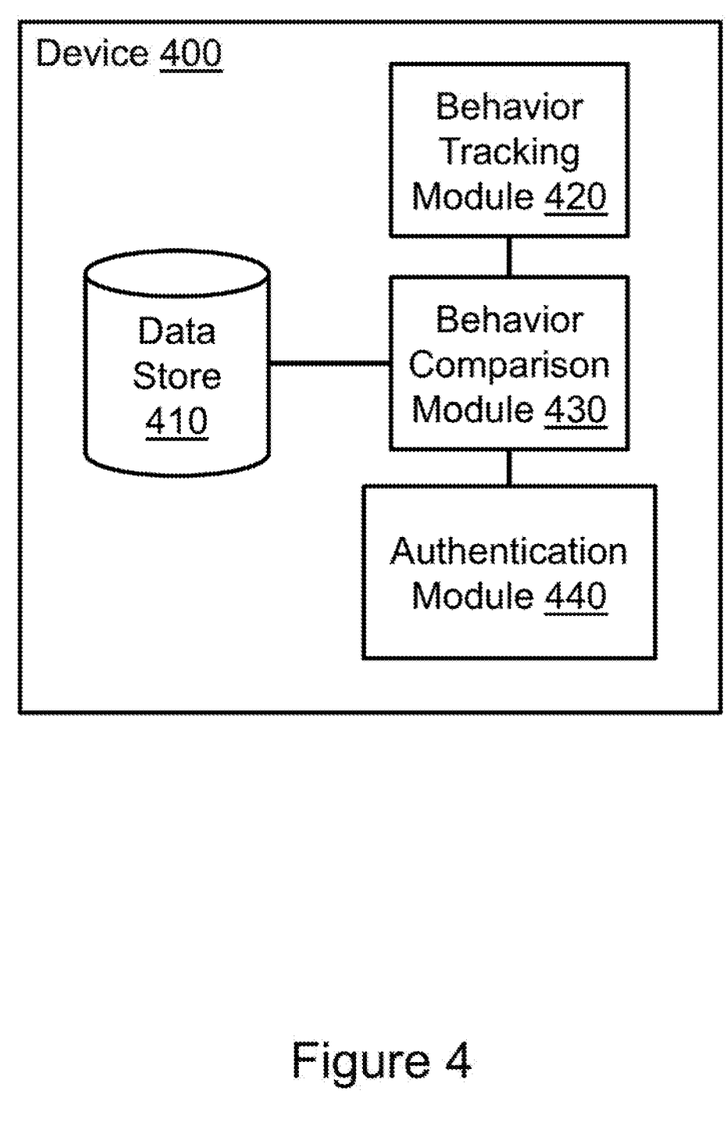
FIG. 4 illustrates an example device associated with user authentication.

FIG. 4 illustrates a device 400. Device 400 includes a data store 410. Data store 410 may store behavior profiles associated with a set of users. The behavior profiles may describe patterns of device usage behavior associated with respective users.

Device 400 also includes a behavior tracking module 420. Behavior tracking module 420 may gather device usage information as device 400 is being operated.

Device 400 also includes a behavior comparison module 430. Behavior comparison module 430 may periodically generate a behavior similarity index. The behavior similarity index may describe a similarity between the device usage information and a selected behavior profile in the data store. Behavior comparison module 430 may also select the set of features index based on distinctive user habits associated with the selected user profile. Behavior comparison module 430 may also generate the behavior similarity index by applying one of a distance measure and a kernel learning technique to the set of features.

Device 400 also includes an authentication module 440. Authentication module 440 may provide an initial access to the device upon successfully authenticating a user based on a credential associated with the user. Authentication module 440 may also designate the selected behavior profile used by the behavior comparison module. The selected behavior profile may be designated based on the successful authentication. Consequently, the selected behavior profile may be associated with the authenticated user. Authentication module 440 may also restrict access to device 400 when the behavior similarity index reaches a predefined threshold.

Figure 5:
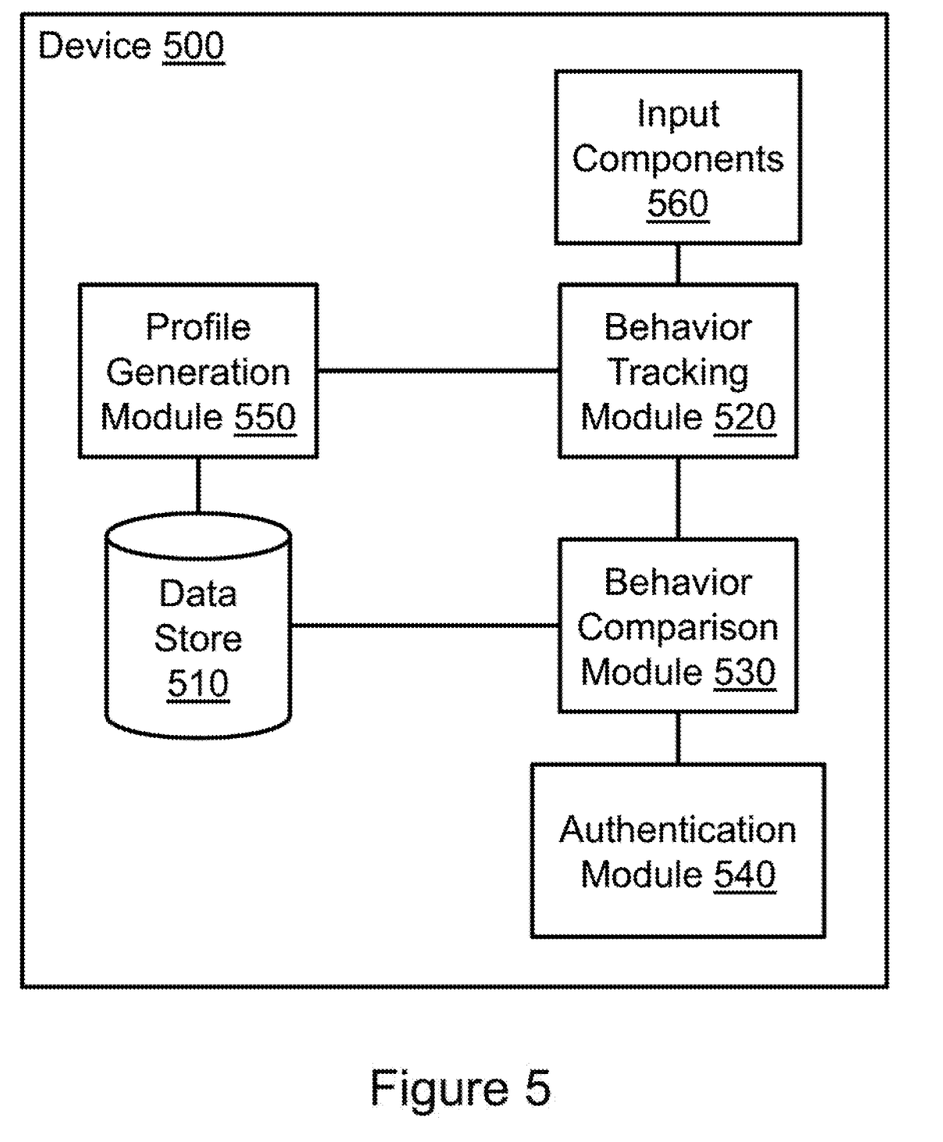
FIG. 5 illustrates another example device associated with user authentication.

FIG. 5 illustrates a device 500 associated with user authentication. Device 500 includes several items similar to those described above with reference to device 400 (FIG. 4). For example, device 500 includes a data store 510, a behavior tracking module 520, a behavior comparison module 530, and an authentication module 540.

Device 500 also includes a profile generation module 550. Profile generation module 550 may update a behavior profile based on device usage information gathered by behavior tracking module 530. In various examples, updating the behavior profile may include creating a behavior profile, modifying a behavior profile, and so forth.

Device 500 also includes a set of input components 560. The input components may be used by behavior tracking module 520 to generate the device usage information. One input component 560 may be a hand motion tracking component. The hand motion tracking component may receive hand motion data during usage of device 500. In some examples, behavior comparison module 530 may generate the behavior similarity index by selecting a set of features based on available input components 560.

Figure 6:
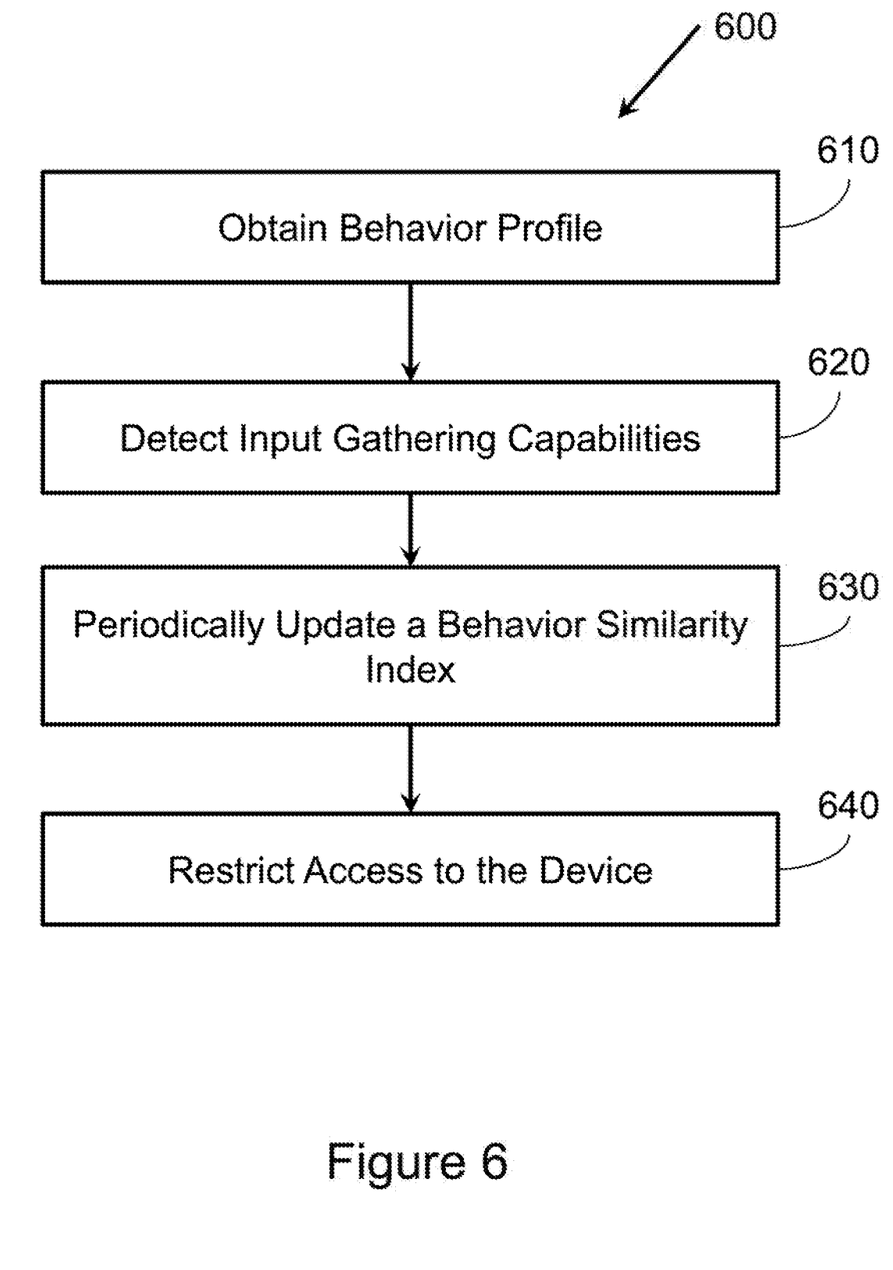
FIG. 6 illustrates another flowchart of example operations associated with user authentication.

FIG. 6 illustrates a method 600 associated with user authentication. Method 600 includes obtaining a behavior profile associated with a user at 610. The behavior profile may be obtained in response to a successful static authentication to a device by the user. The behavior profile may describe a physical pattern of device usage associated with the user. The behavior profile may identify a distinctive user habit.

Method 600 also includes detecting input gathering capabilities of the device at 620. Detecting the input gathering capabilities of the device may include, for example, checking gathered behaviors, examining input devices connected to the device, examining input devices being used, and so forth.

Method 600 also includes periodically updating a behavior similarity index at 630. The behavior similarity index may be updated by comparing physical actions taking during usage of the device to the pattern of device usage associated with the user. The behavior similarity index may take into account the input gathering capabilities of the device. The behavior similarity index may emphasize the distinctive user habit when the input gathering capabilities of the device facilitate detecting the distinctive user habit.

Method 600 also includes restricting access to the device at 640. Access may be restricted when the behavior similarity index reaches a predefined threshold. In some examples, method 600 may include building the behavior profile during a setup period (not shown). Building the behavior profile may involve instructing the user to perform a set of specific tasks.

Figure 7:
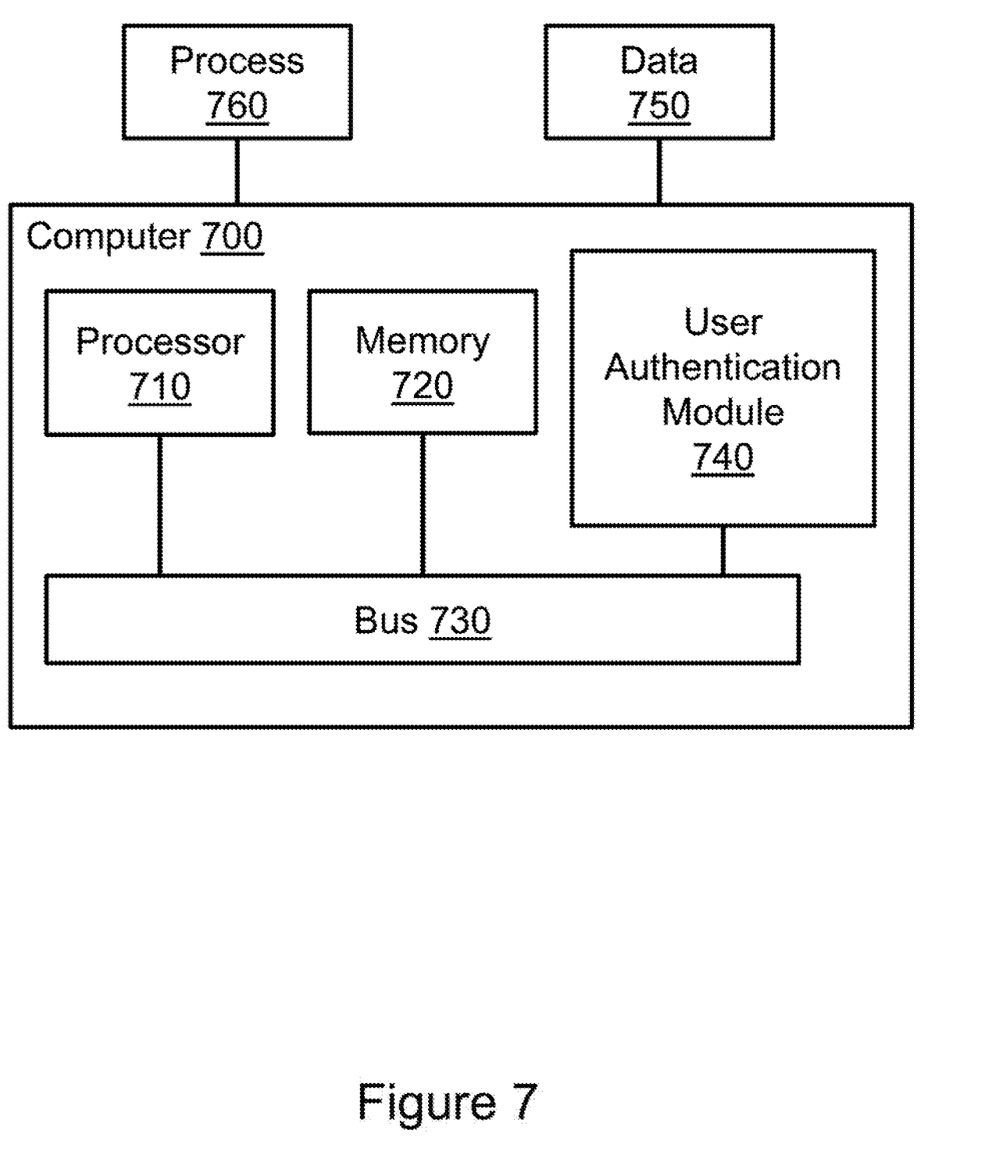
FIG. 7 illustrates an example computing device in which example systems, and methods, and equivalents, may operate.

FIG. 7 illustrates an example computing device in which example systems and methods, and equivalents, may operate. The example computing device may be a computer 700 that includes a processor 710 and a memory 720 connected by a bus 730. Computer 700 includes a user authentication module 740. User authentication module 740 may perform, alone or in combination, various functions described above with reference to the example systems, methods, and so forth. In different examples, user authentication module 740 may be implemented as a non-transitory computer-readable medium storing processor-executable instructions, in hardware, software, firmware, an application specific integrated circuit, and/or combinations thereof.

The instructions may also be presented to computer 700 as data 750 and/or process 760 that are temporarily stored in memory 720 and then executed by processor 710. The processor 710 may be a variety of processors including dual microprocessor and other multi-processor architectures. Memory 720 may include non-volatile memory (e.g., read only memory) and/or volatile memory (e.g., random access memory). Memory 720 may also be, for example, a magnetic disk drive, a solid state disk drive, a floppy disk drive, a tape drive, a flash memory card, an optical disk, and so on. Thus, memory 720 may store process 760 and/or data 750. Computer 700 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method, comprising:
   authenticating a user of a device using a static authentication technique;
   loading a behavior profile associated with the user, where the behavior profile describes patterns of device usage behavior by the user in a three-dimensional space over time slices, and where the behavior profile identifies distinctive user habits;
   detecting behavior gathering capabilities of the device;
   monitoring usage of the device based, at least in part, on the detected behavior gathering capabilities of the device;
   periodically updating a behavior similarity index that describes a similarity between the usage of the device and the patterns of device usage behavior, where the behavior similarity index is weighted based on the distinctive user habits and discounts attributes of the patterns of device usage behavior that the device is incapable of gathering; and
   restricting access to the device when the behavior similarity index reaches a predefined threshold.

2. The method of claim 1, comprising generating the behavior profile.

3. The method of claim 1, comprising updating the behavior profile.

4. The method of claim 1, where the patterns of device usage include information describing one or more of, hand motion data, mouse motion data, keystroke metrics, and stress data.

5. The method of claim 4, where the hand motion data is obtained by tracking motion of a sensory device.

6. The method of claim 1, where the static authentication technique is one of, image based authentication, password authentication, voice authentication, and possession based authentication.

7. A device, comprising:
   a processor;
   a set of input components;
   an electronic data store in digital communication with the processor, the electronic data store to store behavior profiles associated with a set of users, where the behavior profiles describe patterns of device usage behavior associated with respective users;
   a behavior tracking module to gather device usage information as the device is being operated;
   a behavior comparison module to periodically generate a behavior similarity index that describes a similarity between the device usage information and a selected behavior profile in the data store,
   wherein the behavior comparison module generates the behavior similarity index by selecting a set of features based on:
      the set of input components, and distinctive user habits associated with the selected user profile: and an authentication module to provide initial access to the device upon successfully authenticating a user based on a credential associated with the user, to designate, based on the successful authentication, the selected behavior profile used by the behavior comparison module, and to restrict access to the device when the behavior similarity index reaches a predefined threshold.

8. The device of claim 7, comprising a set of input components, where the input components are used by the behavior tracking module to generate the device usage information.

9. The device of claim 8, where the set of input components include a hand motion tracking component that receives hand motion data during usage of the device.

10. The device of claim 7, comprising a profile generation module to update a behavior profile based on device usage information gathered by the behavior tracking module.

11. The device of claim 9, where the behavior comparison module generates the behavior similarity index by applying one of a distance measure and a kernel learning technique to the set of features.

12. A non-transitory computer-readable medium storing computer executable instructions that, when executed, cause the computer to:

obtain a behavior profile associated with a user in response to a successful static authentication by the user to a device, where the behavior profile describes a physical pattern of device usage associated with the user, and where the behavior profile identifies a distinctive user habit;

detect input gathering capabilities of the device;

periodically update a behavior similarity index by comparing physical actions taken during usage of the device to the pattern of device usage associated with the user, where the behavior similarity index takes into account the input gathering capabilities of the device, where the behavior similarity index emphasizes the distinctive user habit when the input gathering capabilities of the device facilitate detecting the distinctive user habit, and where the behavior similarity index is updated by applying one of a distance measure and a kernel learning technique to a set of features associated with the distinctive user habit; and restrict access to the device when the behavior similarity index reaches a predefined threshold.

13. The non-transitory computer-readable medium of claim 12, where the instructions further cause the computer to build the behavior profile during a setup period.

14. The non-transitory computer-readable medium of claim 13 where the user is instructed to perform a specific set of tasks when building the behavior profile.

* * * * *